US009609481B2

(12) United States Patent
Chung

(10) Patent No.: US 9,609,481 B2
(45) Date of Patent: Mar. 28, 2017

(54) SYSTEMS AND METHODS FOR TRANSMITTING VARIABLE BEACON PROFILES

(71) Applicant: FIRST DATA CORPORATION, Greenwood Village, CO (US)

(72) Inventor: Alan L. Chung, New York, NY (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 14/596,756

(22) Filed: Jan. 14, 2015

(65) Prior Publication Data

US 2015/0198690 A1    Jul. 16, 2015

Related U.S. Application Data

(60) Provisional application No. 61/927,338, filed on Jan. 14, 2014.

(51) Int. Cl.
*H04W 24/00* (2009.01)
*H04W 4/02* (2009.01)
*G01S 5/02* (2010.01)

(52) U.S. Cl.
CPC ........... *H04W 4/025* (2013.01); *G01S 5/0236* (2013.01)

(58) Field of Classification Search
CPC .............................. H04W 4/025; G01S 5/0236
USPC ...................................................... 455/456.1
See application file for complete search history.

(56) References Cited

U.S. PATENT DOCUMENTS

| | | | |
|---|---|---|---|
| 2007/0167140 A1 | 7/2007 | Grandhi et al. | |
| 2009/0293011 A1* | 11/2009 | Nassar | G06F 17/30241 715/781 |
| 2011/0314531 A1* | 12/2011 | Kim | G06F 21/305 726/7 |
| 2013/0212176 A1 | 8/2013 | Koulomzin et al. | |
| 2013/0217332 A1* | 8/2013 | Altman | H04H 60/90 455/41.2 |

OTHER PUBLICATIONS

Search Report and Written Opinion for International Application No. PCT/US2015/011362 dated May 8, 2015.
Hun-Wook Kim, "Symmetric Encryption in RFID Authentication Protocol for Strong Location Privacy and Forward-Security." Hybrid Information Technology, 2006. ICHIT '06. International Conference on (vol. 2 ). IEEE Xplore Abstract <http://ieeexplore.ieee.org/xpl/login.jsp?reload=true&tp=&arnumber=4021293&url=http%3A%2F%2Fie>. Nov. 9-11, 2006. 2 pages.

* cited by examiner

*Primary Examiner* — Tanmay Shah
(74) *Attorney, Agent, or Firm* — Eversheds-Sutherland (US) LLP

(57) ABSTRACT

Systems, devices, methods, computer-readable media, techniques, and methodologies are disclosed for transmitting variable beacon profiles. In some embodiments, a server may receive a variable beacon profile at a first point in time, the variable beacon profile associated with a wireless beacon. A temporal indicator indicating the first point in time may be received. Location information associated with the wireless beacon may be determined based at least in part on the variable beacon profile and the temporal indicator. The location information may be transmitted to a service provider application on a mobile device.

14 Claims, 3 Drawing Sheets

SYSTEMS AND METHODS FOR TRANSMITTING VARIABLE BEACON PROFILES

CROSS-REFERENCE TO RELATED APPLICATION

This application claims the benefit of U.S. Provisional Application No. 61/927,338, filed Jan. 14, 2014, entitled "Systems and Methods for Transmitting Variable Beacon Profiles," the contents of which are hereby incorporated by reference.

FIELD OF THE DISCLOSURE

The disclosure generally relates to wireless beacons, and more particularly relates to systems and methods for transmitting variable beacon profiles.

BACKGROUND

Wireless beacons, such as radio beacons, may typically be associated with fixed beacon profiles. As such, fixed beacon profiles may enable relatively simple mappings between radio beacons and precise locations of the radio beacons. The relative ease of such mappings may present certain security and privacy concerns for consumers with mobile devices that communicate with the radio beacons.

BRIEF DESCRIPTION OF THE DISCLOSURE

This disclosure relates to systems and methods for transmitting variable beacon profiles. In one embodiment, a method may include receiving, by a server comprising one or more processors, a variable beacon profile at a first point in time, the variable beacon profile associated with a wireless beacon; receiving, by the server, a temporal indicator indicating the first point in time; determining, by the server based at least in part on the variable beacon profile and the temporal indicator, location information associated with the wireless beacon; and transmitting, by the server, the location information to a service provider application on a mobile device.

In one aspect of an embodiment, the variable beacon profile may include a rolling identifier at the first point in time. In one aspect of an embodiment, the wireless beacon may change the rolling identifier according to predetermined time intervals. In one aspect of an embodiment, determining the location information may include accessing, by the server and using the rolling identifier and the temporal indicator, a lookup table in a database associated with the server; and determining, by the server based at least in part on accessing the lookup table, the location information. In one aspect of an embodiment, the method may include identifying, by the server, a duplicate rolling identifier in the lookup table, wherein the duplicate rolling identifier is the same as the rolling identifier, and wherein the duplicate rolling identifier is associated with different location information. In one aspect of an embodiment, the determining the location information may further include receiving, by the server, global positioning satellite (GPS) coordinates associated with the mobile device; and determining, by the server, that the location information associated with the rolling identifier indicates a closer proximity to the GPS coordinates than indicated by the different location information associated with the duplicate rolling identifier. In one aspect of an embodiment, the temporal indicator may include information associated with at least one of a date or time. In one aspect of an embodiment, the method may further include receiving, by the server, the variable beacon profile at a second point in time, the variable beacon profile comprising a different rolling identifier; receiving, by the server, a second temporal indicator indicating the second point in time; and determining, by the server based at least in part on the different rolling identifier and the second temporal indicator, the location information associated with the wireless beacon. In one aspect of an embodiment, transmitting the location information to a mobile device may include at least one of transmitting an SMS message, transmitting a text message, transmitting an email, or transmitting offer information to an app executing on the consumer's mobile device. In one aspect of an embodiment, the wireless beacon may communicate with the mobile device via at least one of Bluetooth, Bluetooth Low-Energy, near field communication, infrared, or RFID.

In another embodiment, a system may include at least one processor; and at least one memory comprising computer-executable instructions, that when executed by the at least one processor, may cause the at least one processor to receive a variable beacon profile at a first point in time, the variable beacon profile associated with a wireless beacon; receive a temporal indicator indicating the first point in time; determine, based at least in part on the variable beacon profile and the temporal indicator, location information associated with the wireless beacon; and transmit the location information to a service provider application on a mobile device.

In one aspect of an embodiment, the variable beacon profile may include a rolling identifier at the first point in time. In one aspect of an embodiment, the wireless beacon may change the rolling identifier according to predetermined time intervals. In one aspect of an embodiment, the computer-executable instructions to determine the location information may further include instructions to access, using the rolling identifier and the temporal indicator, a lookup table in a database associated with the server; and determine, based at least in part on accessing the lookup table, the location information. In one aspect of an embodiment, the system may further include computer-executable instructions to identify a duplicate rolling identifier in the lookup table, wherein the duplicate rolling identifier is the same as the rolling identifier, and wherein the duplicate rolling identifier is associated with different location information. In one aspect of an embodiment, the computer-executable instructions to determine the location information may further include instructions to receive global positioning satellite (GPS) coordinates associated with the mobile device; and determine that the location information associated with the rolling identifier indicates a closer proximity to the GPS coordinates than indicated by the different location information associated with the duplicate rolling identifier. In one aspect of an embodiment, the temporal indicator may include information associated with at least one of a date or time. In one aspect of an embodiment, the system may include computer-executable instructions to receive the variable beacon profile at a second point in time, the variable beacon profile comprising a different rolling identifier; receive a second temporal indicator indicating the second point in time; and determine, based at least in part on the different rolling identifier and the second temporal indicator, the location information associated with the wireless beacon. In one aspect of an embodiment, transmitting the location information to the mobile device may include at least one of transmitting an SMS message, transmitting a text message, transmitting an email, or transmitting offer information to an app executing on the consumer's mobile device. In one aspect of an embodiment, the wireless beacon may communicate with the mobile device via at least one of Bluetooth, Bluetooth Low-Energy, near field communication, infrared, or RFID.

In one embodiment, a computer-readable medium storing computer-executable instructions which, when executed by a processor, may cause the processor to perform operations including receiving, by a server comprising one or processors, a variable beacon profile at a first point in time, the variable beacon profile associated with a wireless beacon; receiving, by the server, a temporal indicator indicating the first point in time; determining, by the server based at least in part on the variable beacon profile and the temporal indicator, location information associated with the wireless beacon; and transmitting, by the server, the location information to a service provider application on a mobile device.

In one aspect of an embodiment, the variable beacon profile may include a rolling identifier at the first point in time. In one aspect of an embodiment, the wireless beacon may change the rolling identifier according to predetermined time intervals. In one aspect of an embodiment, determining the location information may include accessing, by the server and using the rolling identifier and the temporal indicator, a lookup table in a database associated with the server; and determining, by the server based at least in part on accessing the lookup table, the location information. In one aspect of an embodiment, the operations may include identifying, by the server, a duplicate rolling identifier in the lookup table, wherein the duplicate rolling identifier is the same as the rolling identifier, and wherein the duplicate rolling identifier is associated with different location information. In one aspect of an embodiment, the determining the location information may further include receiving, by the server, global positioning satellite (GPS) coordinates associated with the mobile device; and determining, by the server, that the location information associated with the rolling identifier indicates a closer proximity to the GPS coordinates than indicated by the different location information associated with the duplicate rolling identifier. In one aspect of an embodiment, the temporal indicator may include information associated with at least one of a date or time. In one aspect of an embodiment, the operations may further include receiving, by the server, the variable beacon profile at a second point in time, the variable beacon profile comprising a different rolling identifier; receiving, by the server, a second temporal indicator indicating the second point in time; and determining, by the server based at least in part on the different rolling identifier and the second temporal indicator, the location information associated with the wireless beacon. In one aspect of an embodiment, transmitting the location information to the mobile device may include at least one of transmitting an SMS message, transmitting a text message, transmitting an email, or transmitting offer information to an app executing on the consumer's mobile device. In one aspect of an embodiment, the wireless beacon may communicate with the mobile device via at least one of Bluetooth, Bluetooth Low-Energy, near field communication, infrared, or RFID.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

Figure 1:
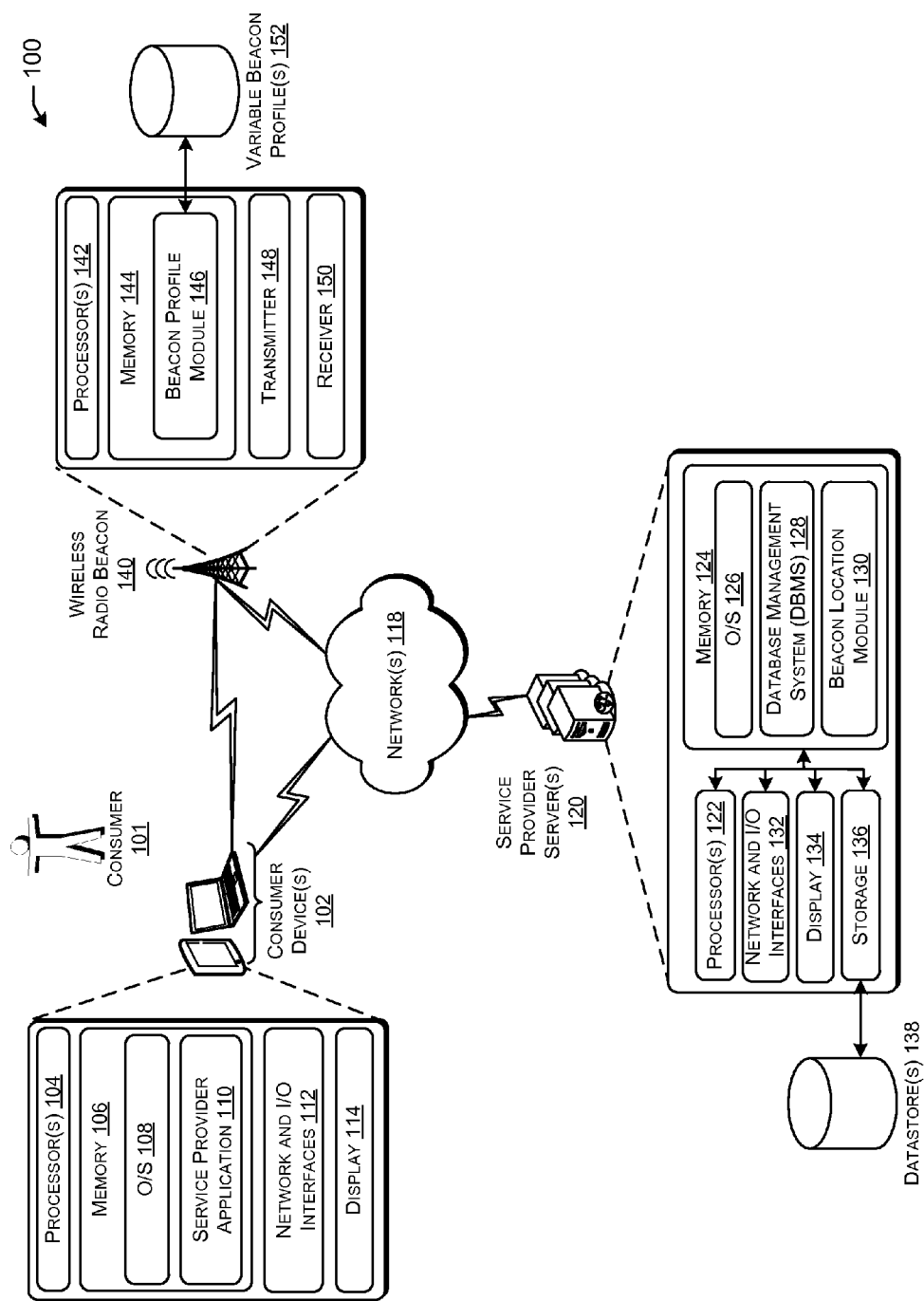
FIG. 1 illustrates an example system for transmitting variable beacon profiles in accordance with one or more example embodiments.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like, but not necessarily the same or identical, elements throughout. Hence, if a feature is used across several drawings, the number used to identify the feature in the drawing where the feature first appeared will be used in later drawings.

DETAILED DESCRIPTION

Overview

Described herein are systems and methods for transmitting variable beacon profiles. Broadly, the systems and methods described herein may facilitate the transmission of variable beacon profiles associated with one or more wireless radio beacons. The systems and methods described herein may further facilitate the determination of location information associated with the wireless radio beacons, based at least in part on the variable beacon profiles.

Thus, according to one or more embodiments of the disclosure, a method is provided for transmitting variable beacon profiles. The method may include receiving, by a server comprising one or processors, a variable beacon profile at a first point in time, the variable beacon profile associated with a wireless beacon. The method may also include receiving a temporal indicator indicating the first point in time. Furthermore, the method may include determining, based at least in part on the variable beacon profile and the temporal indicator, location information associated with the wireless beacon. Additionally, the method may include transmitting the location information to a service provider application on a mobile device.

According to one or more other embodiments of the disclosure, a system is provided for transmitting variable beacon profiles. The system may include at least one memory for storing data and computer-executable instructions. The system may also include at least one processor to access the at least one memory and to execute the computer-executable instructions. The at least one processor may be configured to execute the instructions to receive, a variable beacon profile at a first point in time, the variable beacon profile associated with a wireless beacon. The at least one processor may also be configured to execute the instructions to receive a temporal indicator indicating the first point in time. The at least one processor may further be configured to execute the instructions to determine, based at least in part on the variable beacon profile and the temporal indicator, location information associated with the wireless beacon. Additionally, the at least one processor may further be configured to execute the instructions to transmit the location information to a service provider application on a mobile device.

According to one or more other embodiments of the disclosure, a non-transitory computer-readable medium is provided. The computer-readable medium may store computer-executable instructions, that when executed by at least one processor, cause the at least one processor to receive, a variable beacon profile at a first point in time, the variable beacon profile associated with a wireless beacon. The computer-readable medium may store further instructions that cause the at least one processor to receive a temporal indicator indicating the first point in time. Furthermore, the computer-readable medium may store instructions that cause the at least one processor to determine, based at least in part on the variable beacon profile and the temporal indicator, location information associated with the wireless beacon. The computer-readable medium may also store instructions that cause the at least one processor to transmit the location information to a service provider application on a mobile device.

One or more technical solutions can be achieved by certain embodiments of the disclosure. For example, in at least one embodiment, a wireless radio beacon associated with a particular merchant may be configured to broadcast a variable beacon profile. The variable beacon profile may include a rolling identifier that may be changed by the wireless radio beacon at predetermined intervals. For example, the wireless radio beacon may change the rolling identifier on a daily basis.

Furthermore, a service provider server may store a lookup table, which may associate rolling identifiers and temporal indicators with location information associated with one or more wireless radio beacons. To this end, in order to determine the location of the wireless radio beacon associated with the merchant, the service provider server may be provided (e.g., such as by a mobile device of a consumer) with a rolling identifier associated with the wireless radio beacon and a temporal indicator. The temporal indicator may indicate information associated with a date and/or time. Using the rolling identifier and the temporal indicator, the service provider server may identify the corresponding entry in the lookup table to determine the location of the wireless radio beacon.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Embodiments

With reference now to FIG. 1, an example system 100 for transmitting variable beacon profiles is shown according to one or more embodiments of the disclosure. The system 100 may include one or more consumer device(s) 102 associated with a consumer, such as 101. The consumer device(s) 102 may be in communication, via one or more networks 118, with one or more service provider servers 120, and/or one or more wireless radio beacons 140.

In general, the consumer device 102 may refer to any type of electronic device, and, more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability. The consumer device(s) 102 may include one or more computer processors 104, and a memory 106 storing an operating system (O/S) 108 and a service provider application 110. In addition, the consumer device(s) 102 may include one or more network and I/O interfaces 112, and a display 114. In certain embodiments, the consumer device(s) 102 may include one or more sensors capable of gathering information associated with a present environment of the consumer device(s) 102, or similar hardware devices, such as a camera, a microphone, an antenna, a gesture capture or detection device, or a Global Positioning Satellite (GPS) device.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The consumer device 102 may also include a chipset (not shown) for controlling communications between the one or more processors 104 and one or more of the other components of the consumer device 102. In certain embodiments, the consumer device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106 may include one or more computer-readable storage media (CRSM). In some embodiments, the memory 106 may include non-transitory media such as random access memory (RAM), flash RAM, magnetic media, optical media, solid state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store an operating system 108 that includes a plurality of computer-executable instructions that may be implemented by the computer processor to perform a variety of tasks to operate the interface(s) and any other hardware installed on the consumer device 102. The memory 106 may also store content that may be displayed by the consumer device 102 or transferred to other devices (e.g., headphones) to be displayed or played by the other devices. The memory 106 may also store content received from the other devices. The content from the other devices may be displayed, played, or used by the consumer device 102 to perform any necessary tasks or operations that may be implemented by the computer processor or other components in the consumer device 102.

The memory 106 may also include an operating system (O/S) 108, which may provide an interface between other application software executing on the consumer device 102 and the hardware resources of the consumer device 102. More specifically, the operating system 108 may include a set of computer-executable instructions for managing hardware resources of the consumer device 102 and for providing common services to other application programs (e.g., managing memory allocation among various application programs). The operating system 108 may include any operating system now known or which may be developed in the future including, but not limited to, any consumer operating system, any server operating system, any mainframe operating system, or any other proprietary or freely available operating system.

The memory 106 may also include a service provider application 110, which may be configured to enable a consumer's access to one or more services offered by a service provider (e.g., via the service provider server(s)). Such services may include, but are not limited to, accessing loyalty account information associated with a consumer's activity with a merchant, such as purchase history, loyalty account points, redeemable coupons, redeemed coupon history, merchant offers, progress toward a loyalty account prize/offer, and/or the like. In certain embodiments, the service provider application 110 may be configured to receive a variable beacon profile, from the wireless radio beacon 140. Based at least in part on the variable beacon profile, the service provider application 110 may determine that the wireless radio beacon 140 is associated with a service provider and may transmit a request, to the service provider server(s) 120, for location information associated with the wireless radio beacon 140. In some embodiments, the service provider application 110 may also be configured to transmit one or more global positioning satellite (GPS) coordinates to the service provider server(s) 120.

The one or more network and I/O interfaces 112 may include one or more communication interfaces or network interface devices to provide for the transfer of data between the consumer device 102 and another device (e.g., the network server) via one or more networks, such as 118. The communication interfaces may include, but are not limited to: personal area networks (PANs), wired local area networks (LANs), wireless local area networks (WLANs), wireless wide area networks (WWANs), and so forth. The consumer device 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the consumer device 102 and another device, such as an access point, a host computer, a server, a router, a reader device, and the like. The networks 118 may include, but are not limited to, the Internet, a private network, a virtual private network, a wireless wide area network, a local area network, a metropolitan area network, a telephone network, and so forth.

The display 114 may include, but is not limited to, a liquid crystal display, a light-emitted diode display, or an E-Ink™ display as made by E Ink Corp. of Cambridge, Mass. The display 114 may be used to show content to a user in the form of text, images, or video. In certain instances, the display 114 may also operate as a touch screen display that may enable the user to initiate commands or operations by touching the screen using certain finger or hand gestures.

As previously discussed, one or more service provider server(s) 120 may also be in communication with the network(s) 118. The service provider server(s) 120 may also include a processor 122 and a memory 124, which may store an operating system (O/S) 126, a database management system (DBMS) 128, and a beacon location module 130. The service provider server(s) 120 may also include network and I/O interfaces 132, a display 134, and a storage 136. Storage 136 may provide non-transient storage of computer-executable instructions and other data and may include removable storage and/or non-removable storage including, but not limited to, magnetic storage, optical disk storage, and/or tape storage. The storage 136 may include storage that is internal and/or external to the service provider server(s) 120 and in some implementations, may store and/or may be otherwise associated with a datastore(s) 138. The datastore(s) 138 may be accessible by the DBMS 128.

The DBMS 128 stored in the memory 124 may be configured to support functionality for accessing, retrieving, storing, and/or manipulating data stored in the external datastore(s) 138, data stored in the memory 124, and/or data stored in the data storage 136. For example, the DBMS 128 may be configured to retrieve and/or otherwise access location information associated with the wireless radio beacon 140 (e.g., via a lookup table stored in the memory 124, storage 136, and/or datastore(s) 138. The DBMS 128 may use any of a variety of database models (e.g., relational model, object model, etc.) and may support any of a variety of query languages.

The beacon location module 130 may be configured to determine, retrieve, and/or otherwise access location information associated with the wireless radio beacon 140. For example, the wireless radio beacon 140 may be configured to receive a variable beacon profile (e.g., from the consumer device 102). To this end, the variable beacon profile may include a rolling beacon identifier associated with the wireless radio beacon 140. In addition, the beacon location module 130 may be configured to generate, receive, and/or otherwise access a temporal indicator, which may indicate a point in time at which the variable beacon profile (e.g., the rolling beacon identifier) was received, such as a date, time, and/or the like. Based at least in part on the rolling beacon identifier and the temporal indicator, the beacon location module 130 may determine location information associated with the wireless radio beacon 140. The location information may indicate the location of the wireless radio beacon 140.

For example, as previously discussed, the service provider server 120 may store a lookup table, such as in memory 124, storage 136, datastore(s) 138, and/or the like. In certain implementations, the lookup table may store associations between rolling beacon identifiers, temporal indicators, and location information. For example, the lookup table may store location information indexed by the temporal indicators and the rolling beacon identifiers. Thus, upon receipt of the temporal indicator and the rolling beacon identifier provided by the consumer device 102, the beacon location module 130 may perform a search in the lookup table based on such information.

As previously discussed, one or more wireless radio beacon(s) 140 may also be in communication with the network(s) 118. The wireless radio beacon(s) 140 may also include processor(s) 142 and a memory 144, which may store a beacon profile module 146. The wireless radio beacon 140 may further include a transmitter 148 and a receiver 150. The wireless radio beacon 140 may be a transmission-type device configured to periodically broadcast information. In some embodiments, the broadcast information may include a variable beacon profile, which may include a rolling beacon identifier, though other types of information are also contemplated. Furthermore, various types of wireless technology may be employed to broadcast such information, including, but not limited to, Bluetooth, Bluetooth Low-Energy, Wi-Fi, NFC, Radio Frequency Identification (RFID), infrared, Long-Term Evolution (LTE), and/or LTE-Advanced. As previously discussed, the broadcasted information may include a merchant identifier, location information (e.g., Global Positioning Satellite information, Wi-Fi Positioning System information, etc.), and/or any other type of information associated with the merchant. In certain embodiments, one or more wireless radio beacons 140 may be placed throughout a merchant location or retail store to periodically transmit the broadcasted information.

The beacon profile module 146 may be configured to determine and/or otherwise implement one or more algorithms for determining information to be included in broadcasted variable beacon profile(s) 152. For instance, the beacon profile module 146 may be configured to periodically change and/or determine a rolling beacon identifier to be included in the variable beacon profile 152. In certain embodiments, the beacon profile module 146 may change the rolling beacon identifier on a daily basis, although other time intervals are also contemplated. Moreover, various algorithms may exist for changing the rolling beacon identifier. For instance, the beacon profile module 146 may use and/or may otherwise be associated with a random number generator to generate different rolling identifiers according to one or more predetermined time intervals (e.g., daily, weekly, monthly, etc.).

Figure 2:
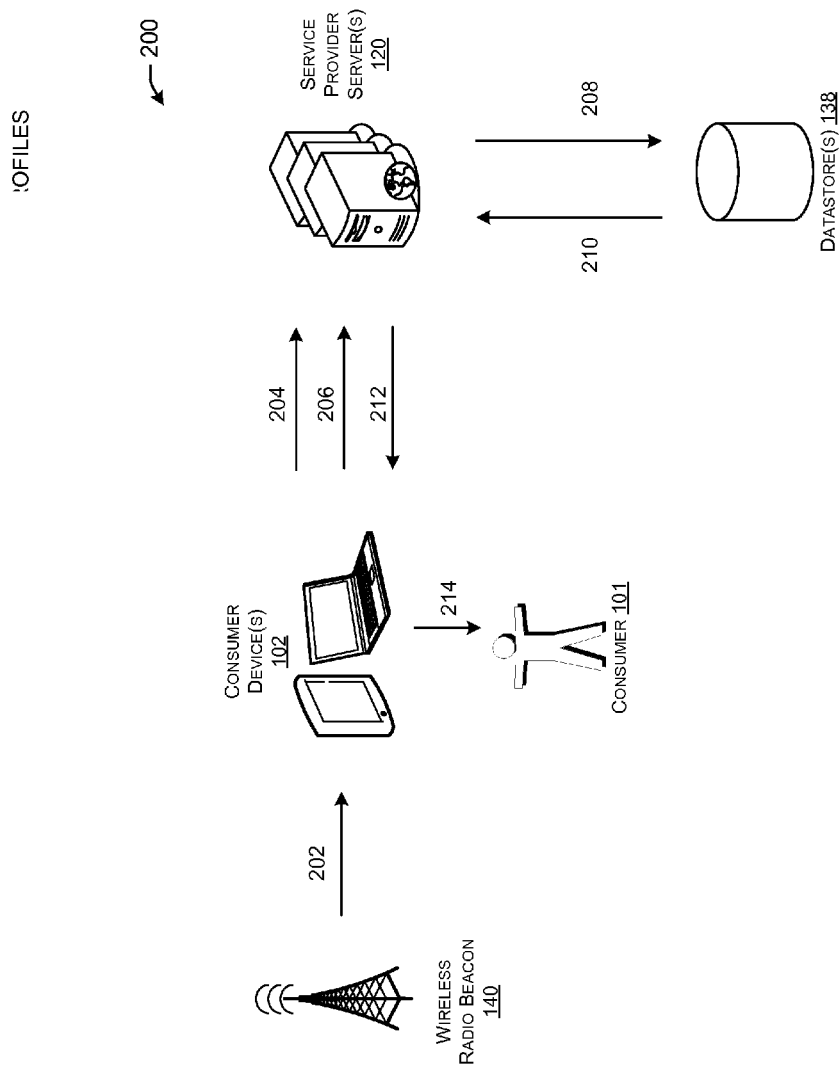
FIG. 2 illustrates a data flow diagram for transmitting variable beacon profiles in accordance with one or more example embodiments.

Referring now to FIG. 2, a diagram of an example data flow 200 is illustrated for transmitting variable beacon profiles in accordance with one or more example embodiments. According to the data flow 200, a wireless radio beacon, such as 140 in FIG. 1, may be configured to periodically broadcast 202 information associated with a merchant and/or the wireless radio beacon 140. In certain implementations, the broadcast information may include a variable beacon profile, which may include a rolling beacon identifier, although other types of information are also possible. A consumer device, such as 102 in FIG. 1, may be configured to receive the variable beacon profile (e.g., the rolling beacon identifier).

In certain embodiments, upon receipt of the variable beacon profile, the consumer device 102 may be configured to "wake-up" and/or launch a service provider application, such as 110 in FIG. 1. Upon receipt, the service provider application 110 may be configured to transmit 204 the variable beacon profile to the service provider server(s) 120. In addition, according to certain embodiments, the consumer device(s) 102 may also be configured to transmit 206 one or more GPS coordinates to the service provider server(s) 120.

According to one or more embodiments, the service provider server(s) 120 in FIG. 1 (e.g., via the beacon location module 130) may be configured to extract and/or otherwise determine the rolling beacon identifier from the variable beacon profile. Furthermore, the service provider server(s) 120 may be configured to receive, retrieve, generate, and/or otherwise access a temporal indicator indicating a point in time at which the variable beacon profile/rolling beacon identifier was received. To this end, the service provider server(s) 120 may use the rolling beacon identifier and the temporal indicator to access 208 a lookup table stored in the datastore(s) 138. Based at least in part on this access to the lookup table, the service provider server(s) 120 may determine location information 210 associated with the wireless radio beacon 140. Upon determining the location information 210, the service provider server(s) 120 may be configured to transmit 212 the location information back to the consumer device(s) 102. In certain implementations, the location information may be provided 214 to the consumer 101 by the consumer device(s) 102 (e.g., via a display 114).

In other implementations, as a result of accessing the lookup table, the service provider server(s) 120 may determine that one or more duplicate rolling identifiers exist (e.g., are stored in the lookup table) that are the same as the rolling beacon identifier. For example, a duplicate rolling identifier may have the same numerical value as the rolling beacon identifier. However, the duplicate rolling identifier may be associated with a second, different location information, which may be different from the location information associated with the rolling beacon identifier. To this end, the service provider server(s) 120 may determine which of the location information or the second different location information is associated with a closer proximity to the GPS coordinates received from the consumer device 102. As such, the determined location information associated with the closer proximity may be transmitted 212 to the consumer device 102.

Figure 3:
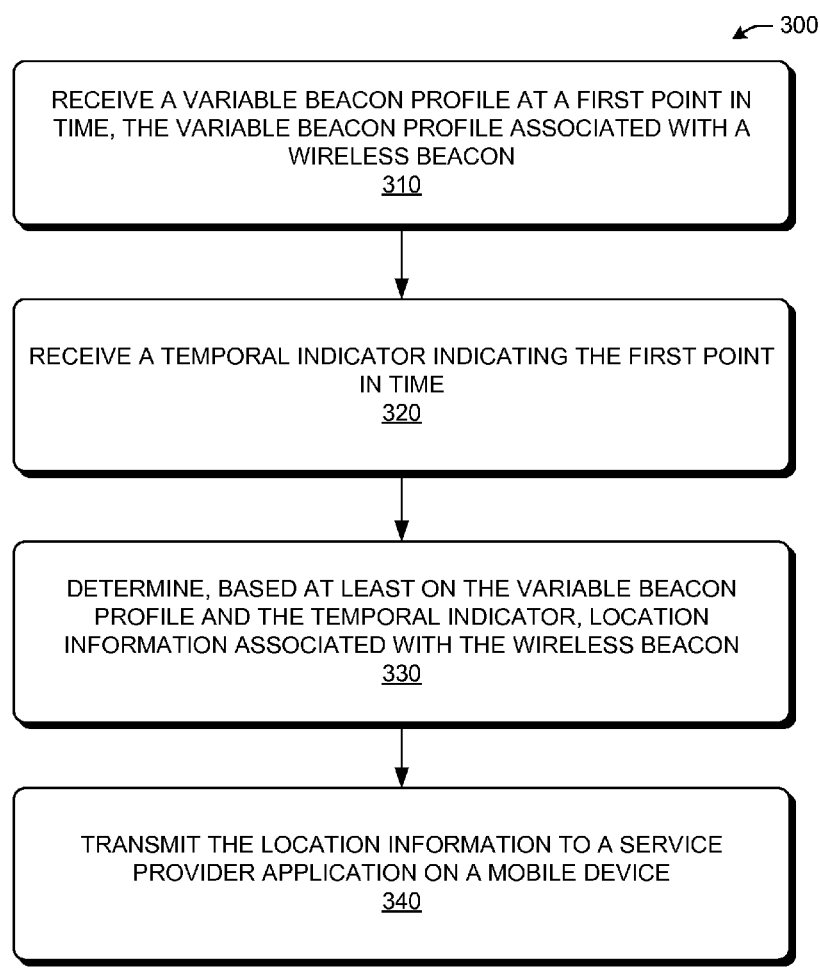
FIG. 3 illustrates a flow diagram of an example data flow for transmitting variable beacon profiles in accordance with one or more example embodiments.

Turning now to FIG. 3, a flow diagram of an example method 300 for transmitting variable beacon profiles is illustrated in accordance with one or more example embodiments. The method may include block 310, in which a server, such as a service provider server, such as 120 in FIG. 1, may receive a variable beacon profile at a first point in time. The variable beacon profile may be associated with a wireless beacon, such as a wireless radio beacon, such as 140 in FIG. 1. In block 320, the service provider server 120 may receive a temporal indicator indicating the first point in time. In block 330, the service provider server 120 may determine, based at least in part on the variable beacon profile and the temporal indicator, location information associated with the wireless radio beacon 140. In block 340, the service provider server 120 may transmit the location information to a service provider application on a consumer device such as 110 and 102, respectively, in FIG. 1.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The invention claimed is:

1. A method comprising:
   receiving, by a server comprising one or processors, a variable beacon profile at a first point in time, the variable beacon profile associated with a wireless beacon and a merchant, wherein the variable beacon profile comprises a rolling identifier changed by the wireless beacon at the first point in time;
   receiving, by the server, a temporal indicator indicating the first point in time;
   determining, by the server based at least in part on the variable beacon profile and the temporal indicator, location information associated with the wireless beacon, wherein determining the location information comprises:
      accessing, by the server and using the rolling identifier and the temporal indicator, a lookup table comprised of associations between rolling beacon identifiers, temporal indicators, and location information in a database associated with the server; and
      determining, by the server based at least in part on accessing the lookup table, the location information; and
   transmitting, by the server, the location information to a service provider application on a mobile device, wherein upon or after receipt of the location information, the service provider application is launched, wherein transmitting the location information to the mobile device comprises at least one of transmitting a SMS message, transmitting a text message, transmitting an email, or transmitting offer information associated with a consumer's loyalty account with the merchant to the service provider application executing on the mobile device, wherein the loyalty account comprises at least purchase history, loyalty account points, redeemable coupons, redeemed coupon history, merchant offers, or progress toward a loyalty account prize or offer.

2. The method of claim 1, wherein the wireless beacon changes the rolling identifier according to predetermined time intervals.

3. The method of claim 1, further comprising:
   identifying, by the server, a duplicate rolling identifier in the lookup table, wherein the duplicate rolling identifier is the same as the rolling identifier, and wherein the duplicate rolling identifier is associated with different location information.

4. The method of claim 3, wherein the determining the location information further comprises:
   receiving, by the server, global positioning satellite (GPS) coordinates associated with the mobile device; and
   determining, by the server, that the location information associated with the rolling identifier indicates a closer proximity to the GPS coordinates than indicated by the different location information associated with the duplicate rolling identifier.

5. The method of claim 1, wherein the temporal indicator comprises information associated with at least one of a date or time.

6. The method of claim 1, further comprising:
   receiving, by the server, the variable beacon profile at a second point in time, the variable beacon profile comprising a different rolling identifier;
   receiving, by the server, a second temporal indicator indicating the second point in time; and
   determining, by the server based at least in part on the different rolling identifier and the second temporal indicator, the location information associated with the wireless beacon.

7. The method of claim 1, wherein the wireless beacon communicates with the mobile device via at least one of Bluetooth, Bluetooth Low-Energy, near field communication, infrared, or RFID.

8. A system comprising:
   at least one processor; and
   at least one memory comprising computer-executable instructions, that when executed by the at least one processor, causes the at least one processor to:
      receive a variable beacon profile at a first point in time, the variable beacon profile associated with a wireless beacon and a merchant, wherein the variable beacon profile comprises a rolling identifier changed by the wireless beacon at the first point in time;
      receive a temporal indicator indicating the first point in time;
      determine, based at least in part on the variable beacon profile and the temporal indicator, location information associated with the wireless beacon, wherein the computer-executable instructions to determine the location information further comprises instructions to:

access, using the rolling identifier and the temporal indicator, a lookup table comprised of associations between rolling beacon identifiers, temporal indicators, and location information in a database associated with the server; and determine, based at least in part on accessing the lookup table, the location information; and transmit the location information to a service provider application on a mobile device, wherein upon or after receipt of the location information, the service provider application is launched, wherein to transmit the location information to mobile device comprises at least one of transmitting a SMS message, transmitting a text message, transmitting an email, or transmitting offer information associated with a consumer s loyalty account with the merchant to the service provider application executing on the mobile device, wherein the loyalty account comprises at least purchase history, loyalty account points, redeemable coupons, redeemed coupon history, merchant offers, or progress toward a loyalty account prize or offer.

9. The system of claim 8, wherein the wireless beacon changes the rolling identifier according to predetermined time intervals.

10. The system of claim 8, further comprising computer-executable instructions to:

identify a duplicate rolling identifier in the lookup table, wherein the duplicate rolling identifier is the same as the rolling identifier, and wherein the duplicate rolling identifier is associated with different location information.

11. The system of claim 10, wherein the computer-executable instructions to determine the location information further comprise instructions to:

receive global positioning satellite (GPS) coordinates associated with the mobile device; and determine that the location information associated with the rolling identifier indicates a closer proximity to the GPS coordinates than indicated by the different location information associated with the duplicate rolling identifier.

12. The system of claim 8, wherein the temporal indicator comprises information associated with at least one of a date or time.

13. The system of claim 8, further comprising computer-executable instructions to:

receive the variable beacon profile at a second point in time, the variable beacon profile comprising a different rolling identifier;

receive a second temporal indicator indicating the second point in time; and determine, based at least in part on the different rolling identifier and the second temporal indicator, the location information associated with the wireless beacon.

14. The system of claim 8, wherein the wireless beacon communicates with the mobile device via at least one of Bluetooth, Bluetooth Low-Energy, near field communication, infrared, or RFID.

* * * * *